United States Patent Office

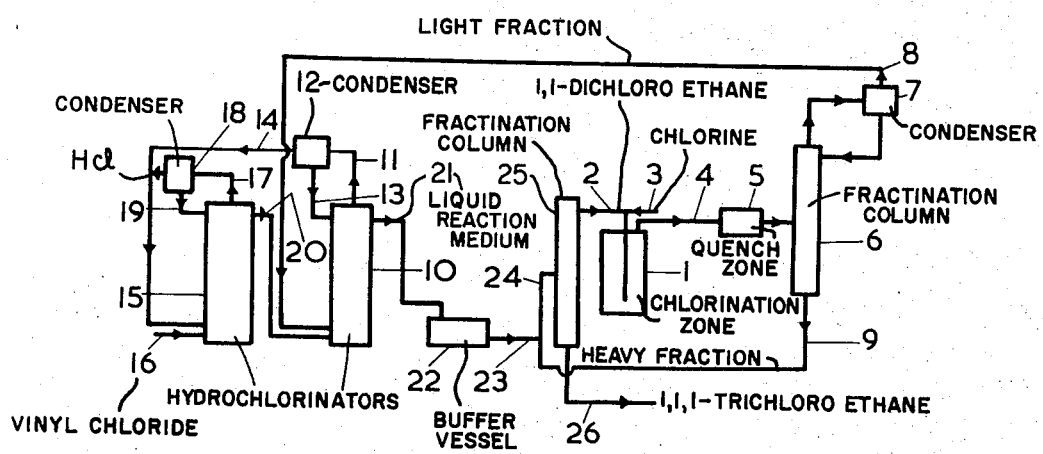

3,825,609
Patented July 23, 1974

1

3,825,609
MANUFACTURE OF 1,1,1-TRICHLOROETHANE
Alastair Campbell and Allan Thoburn, Runcorn, England, assignors to Imperial Chemical Industries Limited, London, England
Filed Sept. 28, 1970, Ser. No. 75,838
Claims priority, application Great Britain, Oct. 15, 1969, 50,715/69
Int. Cl. C07c 17/00
U.S. Cl. 260—658 R    4 Claims

ABSTRACT OF THE DISCLOSURE

In the manufacture of 1,1,1-trichloroethane by the chlorination of 1,1-dichloroethane, a light fraction from the chlorinator exit gases comprising vinyl chloride, vinylidene chloride and hydrogen chloride is passed to a hydrochlorination zone and a vinyl chloride feedstock is hydrochlorinated in a separate hydrochlorination zone. The interlocking steps have the advantage that the two reactions can be effectively controlled and there is practically complete consumption of byproducts of the reaction to give desired products.

---

This invention relates to an improved process for the manufacture of 1,1,1-trichloroethane.

1,1,1-trichloroethane may be manufactured by thermally chlorinating 1,1-dichloroethane, the latter being provided by the hydrochlorination of vinyl chloride in the liquid phase. In the thermal chlorination of 1,1-dichloroethane in the vapour phase there is usually present in the exit gas a mixture of materials. This mixture comprises HCl, 1,1,1-trichloroethane, unreacted 1,1-dichloroethane and vinyl chloride and vinylidene chloride, the two latter materials being produced by cracking of chlorinated ethanes in the chlorination zone.

Now to provide a really worthwhile process maximum utilisation of said chlorinated ethylenes should be effected. That is, the vinyl chloride and vinylidene chloride in the chlorinator exit gas should be substantially converted to 1,1-dichloroethane and 1,1,1-trichloroethane, respectively. This can be attempted by introducing the 1,1,1-trichloroethane, HCl and the chlorinated ethylenes together with an extraneous source of vinyl chloride feedstock into a liquid phase hydrochlorination zone. However, we find that such a procedure is undesirable in that the reaction in the hydrochlorination zone is incomplete, and that the reaction rates of both vinyl chloride and vinylidene chloride are much reduced by the presence of the 1,1,1-trichloroethane brought in from the chlorination zone. The result is that some vinylidene chloride and vinyl chloride pass through the hydrochlorinator unchanged. These chloroethylenes should not be passed to the chlorinator and to remove them from the 1,1-dichloroethane feedstock for the main chlorination zone it may be necessary to provide an auxiliary chlorination zone. In the latter zone vinylidene chloride and vinyl chloride are converted to tetrachloroethane and β-trichloroethane. The latter two materials are removed and this amounts to a loss of vinyl chloride and vinylidene chloride from the system by conversion to undesired materials. An alternative to such a process is to hydrochlorinate an extraneous source of vinyl chloride and to separate and exclude the chlorination reaction product including 1,1,1-trichloroethane from the hydrochlorination zone. This, however, leaves the issue of what to do with the valuable vinyl chloride and vinylidene chloride components of the chlorination product unresolved. In practice it would be lost in association with other chlorinated ethanes such as 1,1-dichloroethane in a distillation train or would find its way back to foul the feed of 1,1-dichloroethane to the chlorinator.

2

We now provide an improved process for the manufacture of 1,1,1-trichloroethane wherein such losses of chloroethylenes are not only minimised but in which the vinyl chloride and vinylidene chloride are converted to form part of a 1,1-dichloroethane feed for a chlorinator and to part of the 1,1,1-trichloroethane product.

Accordingly we now provide a process for the manufacture of 1,1,1-trichloroethane which comprises the step of thermal chlorination of 1,1-dichloroethane part of the 1,1-dichloroethane fed to said chlorination step being produced from a liquid-phase hydrochlorination zone wherein a light fraction comprising vinyl chloride, vinylidene chloride and hydrogen chloride of the materials leaving the said chlorination step is converted into 1,1-dichloroethane and 1,1,1-trichloroethane, and another part of the 1,1-dichloroethane fed to the said chlorination step being produced in a separate liquid-phase hydrochlorination zone wherein vinyl chloride from an extraneous source is converted with hydrogen chloride to 1,1-dichloroethane.

Such a process lends itself admirably to an integrated process for the manufacture of 1,1,1-trichloroethane which comprises (1) thermally chlorinating 1,1-dichloroethane,
(2) separating a light fraction comprising vinyl chloride, vinylidene chloride and hydrogen chloride from the chlorinator exit product,
(3) passing at least a portion of said light fraction to a hydrochlorination zone wherein in a catalysed liquid-phase reaction vinyl chloride is converted to 1,1-dichloroethane and vinylidene chloride is converted to 1,1,1-trichloroethane,
(4) hydrochlorinating a source of vinyl chloride feedstock extraneous to the system in a separate catalysed liquid-phase hydrochlorination zone to produce 1,1-dichloroethane,
(5) passing 1,1-dichloroethane recovered from said hydrochlorination zones and unreacted 1,1-dichloroethane to the chlorination zone,
(6) separating a heavy fraction from the chlorinator exit product comprising 1,1,1,-trichloroethane substantially free from vinyl chloride and vinylidene chloride, and
(7) recovering 1,1,1-trichloroethane from the hydrochlorination zone wherein vinylidene chloride is reacted with hydrogen chloride and from said heavy fraction from the chlorination zone.

The liquid medium in the hydrochlorination zones may initially contain any inert organic liquid. Very suitably the liquid medium initially employed in the hydrochlorination zones comprises 1,1-dichloroethane. The catalyst employed in the hydrochlorination zones is a Friedel-Crafts catalyst, suitably ferric chloride. Various means may subsequently be employed to free the liquid medium from the catalyst but a suitable means is to remove the catalyst by flash-evaporation, steam distillation or by water-washing. Liquid medium can be withdrawn separately from the hydrochlorinators and the dichloroethane and 1,1,1-trichloroethane recovered therefrom.

Unreacted 1,1-dichloroethane may be present in the light and/or heavy fraction from the chlorinator. Often it is present in both the light and heavy fraction. It is preferred to pass all the light fraction to the first hydrochlorination zone.

Use of a hydrochlorination zone into which is fed the light fraction from the chlorinator in association with the second hydrochlorinator into which is fed an extraneous source of vinyl chloride is decidedly advantageous. Thus in the second hydrochlorinator the bulk of the vinyl chloride to be used in the process is quickly and cleanly converted to 1,1-dichloroethane. In a preferred form of the present process a liquid medium consisting essentially of 1,1-dichloroethane is withdrawn from the second hydrochlorinator and passed to the first hydrochlorinator. This has the advantage that if a surge occurs in the second hydrochlorinator such that some vinyl chloride remains unreacted this vinyl chloride (most of which is dissolved in 1,1-dichloroethane) passes to the first hydrochlorinator where it has a further opportunity of being converted to 1,1-dichloroethane. In the first hydrochlorinator there is a good opportunity for the vinylidene chloride (as well as vinyl chloride) to be hydrochlorinated. This reaction goes forward much more quickly than would be the case if the 1,1,1 - trichloroethane from the chlorinator were introduced into a single hydrochlorination zone. Again passing 1,1-dichloroethane from the second hydrochlorinator and/or that contained in the light fraction in to the first hydrochlorination zone has two main effects. Firstly it dilutes the reaction mixture by making it less rich in 1,1,1-trichloroethane and therefore the disadvantages associated therewith are correspondingly reduced. Secondly if a hydrochlorinator of a specific size is used and a certain volume of say vinyl chloride is passed therethrough the residence time is fixed. However we find that in such a hydrochlorinator one can also pass 1,1-dichloroethane through such a hydrochlorinator thereby reducing the residence time while yet achieving higher conversions and throughputs for the same reactor. Although 1,1,1-trichloroethane is formed by conversion of vinylidene chloride in the first hydrochlorinator the advantages referred to hereinbefore are still obtained by the present process of the invention.

Practically complete consumption of all the vinyl chloride and vinylidene chloride made in the system is effected in the present process. However if by chance under abnormal conditions a small amount of vinyl chloride in the first and/or second hydrochlorinator and vinylidene chloride in the second hydrochlorinator remains unreacted liquor from the first hydrochlorinator comprising 1,1-dichloroethane could be passed to form the reaction medium for a third hydrochlorinator while liquor comprising 1,1-dichloroethane and some 1,1,1-trichloroethane could also be passed from the first hydrochlorinator to the third hydrochlorinator wherein reaction is completed.

Atmospheric or superatmospheric pressures may be used in the chlorination and hydrochlorination zones. Suitably, temperatures in the range 20° C. to 70° C. are employed in the hydrochlorination zones. Temperatures in the range 20° C. to 40° C. give good results when hydrochlorination is effected at substantially atmospheric pressure. Some vinylidene chloride may if desired be tapped off as a useful product before the hydrochlorination stage.

Various means may be employed for effecting the thermal chlorination of 1,1-dichloroethane. Preferably this is effected by introducing 1,1-dichloroethane and chlorine into a tubular reactor closed at one end thereby providing a turbulent reaction zone within the reactor at the closed end thereof and continuously withdrawing the gaseous reaction product from said reactor as is fully described in co-epending application Ser. No. 3,244. Good results can, for example, be obtained when using molar ratios of $Cl_2$/1,1-dichloroethane in the range 0.45:1 to 0.7:1, reaction temperatures in the range 375° C. to 420° C., pressures in the range 20 p.s.i.g. to 60 p.s.i.g. and contact times of 10 to 20 seconds.

One suitable type of apparatus for carrying out the process of the invention is described in the accompanying drawing which is not drawn to scale. In the drawing 1 is a chlorination zone. 2 and 3 are inlets for 1,1-dichloroethane and chlorine respectively. 4 is a pipe for the chlorination exit gas. 5 represents a quench system. 6 is a fractionating column surmounted by a condenser 7. 8 is a pipe for taking off a light fraction for transfer to first hydrochlorination zone 10. 9 and 24 are pipes for transfer of a heavy fraction to fractionation column 25. 11 is a pipe for taking off a vapour stream. 12 is a condenser wherefrom liquid is transferred via pipe 13 to zone 10. 14 is for transfer of HCl to second hydrochlorination zone 15. 16 is for introduction of vinyl chloride. Zone 15 is surmounted through pipe 17 by condenser 18 wherefrom liquid is transferred via pipe 19 to zone 15. 20 is a pipe for the transfer of a liquid medium from zone 15 to zone 10. 21 is a pipe for transfer of liquid medium to a delay and buffer vessel 22. Thereafter means such as a water wash and steam distillation are provided for removal of $FeCl_3$ catalyst (for the sake of clarity these are not shown in the drawing). Pipes 23 and 24 serve to transfer a medium consisting essentially of 1,1-dichloroethane (and some 1,1,1-trichloroethane) to fractionation column 25. Pipe 26 is for withdrawal of crude 1,1,1-trichloroethane.

When using the apparatus illustrated in the drawing 1,1-dichloroethane and chlorine are introduced through pipes 2 and 3, respectively, into chlorination zone 1. A gaseous reaction product leaves by pipe 4, is quenched in 5, and then passes to fractionation column 6. The vapours leaving the top of the column pass into condenser 7 and a condensate is returned to the column. A light fraction comprising vinyl chloride, vinylidene chloride, hydrogen chloride, unreacted 1,1-dichloroethane and possibly a small amount of sym-dichloroethylene passes through pipe 8 to hydrochlorination zone 10. A heavy fraction comprising 1,1,1-trichloroethane, unreacted 1,1-dichloroethane and which may contain other chlorinated $C_2$ and $C_3$ hydrocarbons is withdrawn via pipe 9 and passes through pipe 24 to fractionation column 25. A vapour stream passes through pipe 11 to condenser 12 wherefrom a liquid comprising 1,1-dichloroethane, and small amounts of HCl, 1,1,1-trichloroethane, vinyl chloride, and vinylidene chloride are returned via pipe 13 to zone 10. HCl vapour passes through pipe 14 to zone 15. Vinyl chloride is introduced through 16 into zone 15 which contains a liquid medium consisting essentially of 1,1-dichloroethane and ferric chloride catalyst. A vapour stream leaves zone 15 via pipe 17 and passes into condenser 18. A condensate comprising 1,1-dichloroethane and small amounts of vinyl chloride and HCl is returned via pipe 19 to zone 15. HCl vapour leaving condenser 18 joins that in pipe 14. From zone 15 a liquid medium comprising 1,1-dichloroethane containing $FeCl_3$ as catalyst is withdrawn via pipe 20 and is fed to zone 10. Substantially complete conversion of vinyl chloride and vinylidene chloride occurs in zone 10. From zone 10 a liquid reaction medium is withdrawn and passed via pipe 21 to buffer vessel 22. After passing through pipe 23 the liquid medium is freed from $FeCl_3$ by standard means and is then passed via pipe 24 to fractionation column 25. Substantially pure 1,1-dichloroethane is withdrawn from the top of column 25 and passes via pipe 2 to chlorinator 1. 1,1,1-trichloroethane in association with a small amount of other chlorinated hydrocarbons is withdrawn through pipe 26 and is then further purified by fractional distillation to give 1,1,1-trichloroethane of excellent quality.

The following example illustrates but does not limit the invention.

EXAMPLE

The apparatus comprised a vertical "Inconel" reactor ("Inconel" is a registered trademark) provided with a silliminate lining. The reactor was 55 cm. long and 8¼ cm. internal diameter and was heated initially by an electric furnace surrounding the reactor. A T-piece made of "Inconel" (registered trademark) was provided of internal diameter 0.78 cm., the vertical arm of the T dipping centrally within the reactor and terminating 7.1 cm. from the closed end which formed the base of the reactor. The contact time was 19 seconds.

Vaporised 1,1-dichloroethane (524 parts) and vaporised chlorine (205 parts) were introduced separately through the arms of the T-piece and were heated to a temperature of 160° C. at the junction of the horizontal and vertical arms of the T-piece. The reaction was carried out at a pressure of 30 p.s.i.g. The peak temperature was 410° C.

and the contact time was 18 seconds. The reaction gas was withdrawn near the top of the reactor and was found to contain 174 parts unreacted 1,1-dichloroethane, 44 parts vinylidene chloride, 52 parts vinyl chloride, 154 parts HCl, 257 parts 1,1,1-trichloroethane, 21 parts 1,1,2-trichloroethane and 35 parts other chlorinated hydrocarbons.

A (second) hydrochlorinator containing 500 parts 1,1-dichloroethane and 5 parts ferric chloride as catalyst was maintained at 30° C. 170 parts vinyl chloride feedstock extraneous to the system and 100 parts hydrogen chloride and 3.5 parts ferric chloride were passed during each hour of operation into this hydrochlorinator. 268 parts 1,1-dichloroethane were made and passed into a (first) hydrochlorinator.

The latter hydrochlorinator contained a total of 600 parts 1,1-dichloroethane and 6 parts ferric chloride and was maintained at 30° C. 52 parts vinyl chloride, 44 parts vinylidene chloride and 154 parts hydrogen chloride corresponding to a light fraction from the chlorinator and 2 parts ferric chloride were passed during each hour of operation into this hydrochlorinator. When stable conditions had been established there was withdrawn a liquid product containing 80 parts 1,1-dichloroethane, 60 parts 1,1,1-trichloroethane and 100 parts hydrogen chloride which was available for passing to the first hydrochlorinator.

There was obtained a total of 323 parts 1,1,1-trichloroethane corresponding to a yield based on vinyl chloride and chlorine fed to the system of 89% to 81% respectively.

What we claim is:

1. The process for producing 1,1,1-trichloroethane which comprises the steps of:
   (1) thermally chlorinating with chlorine 1,1-dichloroethane in the molar ratio of chlorine to 1,1-dichloroethane of from 0.45:1 to 0.7:1 at a temperature of from 357° C. to 420° C.;
   (2) separating the chlorinated product of step (1) by fractional distillation into (a) a light fraction comprising vinyl chloride, vinylidene chloride, 1,1-dichloroethane and hydrogen chloride and (b) a heavy fraction being the balance of the chlorinated product and containing 1,1,1-trichloroethane and 1,1-dichloroethane;
   (3) subjecting said light fraction of step (2(a)) to a catalyzed liquid phase hydrochlorination reaction in a first hydrochlorinator to convert the vinyl chloride to 1,1-dichloroethane and vinylidene chloride to 1,1,1-trichloroethane, while removing unreacted hydrogen chloride therefrom;
   (4) subjecting vinyl chloride from an extraneous source to a catalyzed liquid phase hydrochlorination reaction in a separate second hydrochlorinator and using the hydrogen chloride removed from the hydrochlorination of step (3) to produce 1,1-dichloroethane and passing said 1,1-dichloroethane obtained to the hydrochlorinator of step (3); and
   (5) combining the chlorinated products of step (3) with the heavy fraction of step (2(b)) and recovering therefrom a fraction consisting essentially of 1,1-dichloroethane and a fraction consisting essentially of 1,1,1-trichloroethane, and passing the 1,1-dichloroethane fraction to the thermal chlorination of step (1).

2. The process of claim 1 wherein the catalyst is ferric chloride.

3. The process of claim 2 wherein the hydrochlorination reaction temperature is in the range of from 20° C. to 70° C.

4. The process of claim 3 wherein the hydrochlorination temperature is in the range of from 20° C. to 40° C. and the hydrochlorination reactions are carried out at substantially atmospheric pressures.

References Cited

UNITED STATES PATENTS

| | | | |
|---|---|---|---|
| 3,059,035 | 10/1962 | Benner et al. | 260—658 R |
| 3,304,337 | 2/1967 | Jordan et al. | 260—658 R |
| 2,209,000 | 7/1940 | Nutting et al. | 260—658 R |
| 2,007,144 | 7/1935 | Nutting et al. | 260—658 R |
| 3,065,280 | 11/1962 | Vogt | 260—658 R |
| 3,012,081 | 12/1961 | Conrad et al. | 260—658 R |
| 3,012,080 | 12/1961 | Bergeron | 260—658 R |

LEON ZITVER, Primary Examiner

J. A. BOSKA, Assistant Examiner

U.S. Cl. X.R.

260—654 H, 656 R